United States Patent [19]
Wells

[11] Patent Number: 5,847,772
[45] Date of Patent: Dec. 8, 1998

[54] ADAPTIVE FILTER FOR VIDEO PROCESSING APPLICATIONS

[76] Inventor: Aaron Wells, 20 Oxford Rd., New Rochelle, N.Y. 10804

[21] Appl. No.: 712,128

[22] Filed: Sep. 11, 1996

[51] Int. Cl.⁶ .................................................. H04N 7/01
[52] U.S. Cl. ........................ 348/571; 348/459; 348/610; 348/446
[58] Field of Search ..................... 348/571, 459, 348/448, 97, 911, 910, 608, 610, 446; H04N 7/01, 11/020, 5/44, 9/64

[56] References Cited

U.S. PATENT DOCUMENTS

| | | | |
|---|---|---|---|
| 4,216,496 | 8/1980 | Lothian et al. | 358/83 |
| 4,502,076 | 2/1985 | Cluniat et al. | 358/160 |
| 4,731,660 | 3/1988 | Faroudja et al. | 358/31 |
| 4,745,458 | 5/1988 | Hirano et al. | 358/11 |
| 5,019,904 | 5/1991 | Campbell | 358/140 |
| 5,097,322 | 3/1992 | Fairhurst | 358/31 |
| 5,302,968 | 4/1994 | Heberle | 345/131 |
| 5,485,533 | 1/1996 | Hatano et al. | 382/236 |
| 5,517,248 | 5/1996 | Isoda | 348/459 |
| 5,734,419 | 3/1998 | Botsford, III et al. | 348/97 |
| 5,757,435 | 5/1998 | Wells | 348/441 |

*Primary Examiner*—John K. Peng
*Assistant Examiner*—James Reed, Jr.
*Attorney, Agent, or Firm*—Proskauer Rose LLP

[57] ABSTRACT

The invention provides methods and apparatus for filtering an input video frame sequence to be encoded. An odd-tap filter is used to generate a first interpolated pixel from a group of pixels in an even field of the video sequence. An even-tap filter is used to generate a second interpolated pixel from a group of pixels in an odd field of the video sequence. The use of the even-tap filter for the group of pixels in the odd field ensures that the interpolated pixels generated for both the odd and even fields are located at substantially the same vertical location. This significantly reduces an undesirable vertical signal component which would otherwise be generated when the first and second interpolated pixels are subtracted as part of a field comparison operation. The resulting improvement in field comparison accuracy provides advantages in a variety of video preprocessing applications such as deinterlacing, inverse telecine processing, adaptive field/frame filtering and PAL video framing.

23 Claims, 8 Drawing Sheets

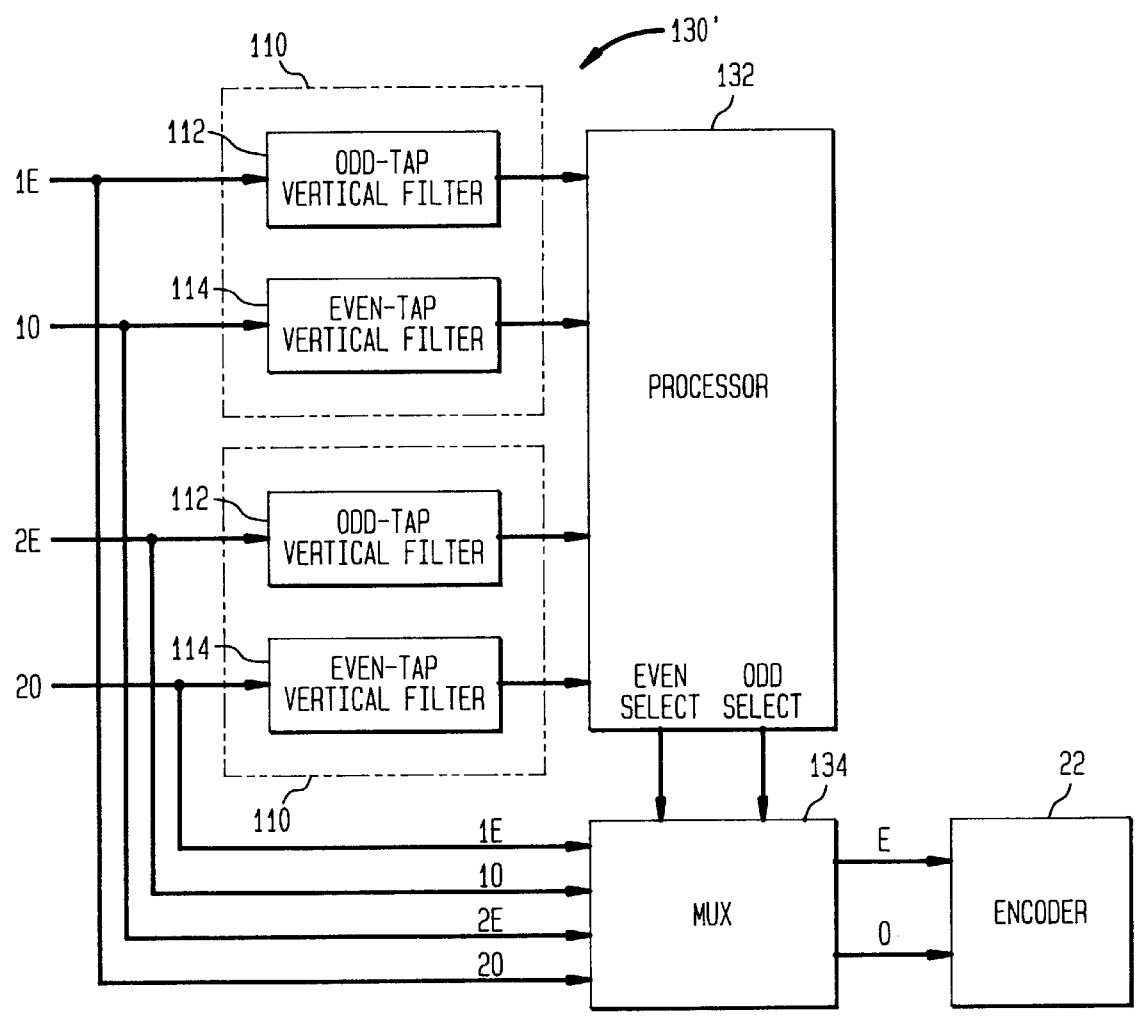

ADAPTIVE FILTER FOR VIDEO PROCESSING APPLICATIONS

FIELD OF THE INVENTION

The present invention relates generally to adaptive filtering suitable for use in video preprocessing applications such as inverse telecine processing. More particularly, the invention relates to an adaptive vertical filter which includes odd-tap and even-tap filters for filtering first and second fields, respectively, in a video frame sequence.

BACKGROUND OF THE INVENTION

FIG. 1A shows a conventional video encoding system 12 in which a video source 14 generates a sequence of progressive or interlaced frames to be encoded in accordance with a video compression technique such as MPEG-2. A progressive frame sequence generally has a frame rate on the order of 30 frames per second with a single field in each frame, while an interlaced frame sequence generally includes two fields in each frame and therefore will include 60 fields per second at a 30 frame per second frame rate. The two fields in each frame of the interlaced sequence include an even field corresponding to even scan lines and an odd field corresponding to odd scan lines. NTSC video generally uses 525 scan lines per frame and a 60 field per second display, while PAL video uses 625 scan lines per frame and a 50 field per second display. The video source 14 may generate an analog NTSC or PAL video signal which is converted to a SIF format with a luminance signal and two chrominance signals and then digitized to provide a digital video signal. The video source 14 may also provide telecine material generated using a 3:2 pulldown technique. As will be described in greater detail below, a 3:2 pulldown technique converts film having a frame rate of 24 frames per second into a 60 field per second digital video signal. The digital video signal from the video source 14 is applied to a video capture buffer 16 in the encoding system 12.

FIG. 1B illustrates an exemplary video capture buffer 16 in greater detail. The buffer 16 includes a first dual field buffer 42 and a second dual field buffer 44. The first dual field buffer 42 includes a first even field buffer 42A and a first odd field buffer 42B. The second dual field buffer 44 includes a second even field buffer 44A and a second odd field buffer 44B. The capture buffer 16 further includes a demultiplexer 46 which receives an input sequence of video fields from the video source 14 and outputs each field to one of the field buffers 42A, 42B, 44A or 44B. The outputs of the field buffers in video capture buffer 16 are supplied to an inverse telecine circuit 18 and a preprocessor buffer 22 of a video encoder 20.

The video encoder 20 as shown in FIG. 1A also includes a video preprocessor 24, a video compression circuit 26 and a rate buffer 28. A controller 30 directs the operations of preprocessor 24, compression circuit 26 and rate buffer 28 to provide a compressed video bit stream at an output 32 of the encoder 20. The compressed video bit stream may be further processed in additional system elements such as multiplexers, modulators and the like. The processed video bit stream may then be transmitted over a communication channel to one or more video decoders, or stored in a magnetic or electronic memory, a recordable compact disk (CD) or another suitable storage device.

The preprocessor 24 processes the video signal so that it may be more accurately and efficiently compressed by the video compression circuit 26. For example, the preprocessor 24 may alter the frame format in terms of the number of horizontal or vertical pixels to meet parameters specified by the video compression circuit 26. In addition, the preprocessor 24 can detect scene changes or other changes which increase compression difficulty. A scene change increases the amount of bits required because predictive encoding cannot initially be used. If the preprocessor 24 detects a scene change, this information is communicated by preprocessor 24 to the video compression circuit 26 and controller 30. A fade, representing a continuous decrease or increase in luminance level to or from black over several time frames, can also cause difficulties for the video compression circuit 26 because it can cause a failure in motion compensated prediction. The preprocessor 24 can detect and inform the video compression circuit 26 of a fade so that the compression circuit 26 can take appropriate precautions.

The compression circuit 26 receives a video signal from the preprocessor 24 in the form of a sequence of fields and outputs a compressed digital video bit stream compliant with the syntax specified in MPEG-2 or another suitable video compression standard. The video bit stream generated by the video compression circuit 26 is stored in a rate buffer 28. The controller 30 controls the number of bits allocated by the video compression circuit 26 to the frames to be encoded. The controller 30 allocates bits to the frames so as not to exceed limitations on rate buffer occupancy and channel bandwidth. This is turn prevents overflow and/or underflow conditions in a decoder buffer receiving the bit stream generated by the encoder 20.

The processing of telecine material in the system 12 of FIG. 1A will now be described in greater detail. FIG. 2A shows a sequence of film frames at 24 frames per second labeled A, B, C, ... and a corresponding sequence of video fields at 60 fields per second derived from frames A, B, C, ... using a 3:2 pulldown technique. The 3:2 pulldown technique generates three video fields for a given frame, two fields for the next frame in the sequence, two fields for the frame after that and so on in a 3,2,3,2,3,2 ... pattern. When three video fields are generated for a given film frame, the third field is a repeat of the first field. For example, the first video field $a_1$ in FIG. 2A is an odd field derived from the first film frame A, the second video field $a_2$ is an even field derived from film frame A, and the third video field $a_3$ is the same as $a_1$. The fourth video field $b_1$ is an even field derived from the film frame B and the fifth video field $b_2$ is an odd field derived from film frame B. The sixth, seventh, and eighth video fields, $c_1$, $c_2$, $c_3$, are even, odd, and even fields, respectively, and are derived from the film frame C, with $c_3$ being a repeat of $c_1$. The number of fields per frame of video in FIG. 2A thus follows the above-noted 3:2 pulldown pattern.

FIG. 2B indicates that the 3:2 pulldown pattern repeats itself every five input video frames, such that there are only five possible phases for the pattern. The five phases are labelled Phase 0 through Phase 4 in FIG. 2B. Each dot designates a field of a video frame, and the interconnection of the dots indicates the grouping of the fields into frames in accordance with the above-described 3:2 pulldown pattern. The upper rows of dots for a given pattern phase correspond to odd fields while the lower rows of dots correspond to even fields. Each Phase i of FIG. 2B is shifted by one frame time relative to the previous Phase i-1. It can be seen that an additional shift of Phase 4 would result in the same 3:2 pattern as Phase 0.

The inverse telecine circuit 18 of FIG. 1A is operative to detect the 3:2 pulldown pattern phase and to drop any repeat fields so as reduce the data bandwidth requirements of the encoded video bit stream. The detection and dropping of repeat fields thus ensures that scarce communication channel and storage system resources are not wasted on the encoding of repeat fields. An MPEG-2 compliant encoder may set a repeat$_{13}$ first$_{13}$ field flag in an encoded frame to indicate that the unencoded frame includes a repeat field. A corresponding MPEG-2 decoder will then redisplay the first field of a frame having a set repeat$_{13}$ first$_{13}$ field flag after displaying the first and second fields of that frame. The decoder output field rate can thereby be maintained at 60 fields per second despite the fact that some or all repeat fields were dropped prior to encoding.

The 3:2 pulldown pattern of a video sequence to be encoded may be interrupted in a variety of situations. For example, an editing operation in which a new film segment is combined with an old film segment may produce the following pattern in which the arrow indicates the edit point:

3,2,3,2,3,3,2,3,2, . . .
↑

An editing operation in which a conventional video sequence representing a commercial is inserted into a 3:2 pulldown sequence derived from film may produce the following pattern:

. . . 3,2,3,2,3,2,  2,2,2,2,2, . . . ,2,2,  3,2,3,2,3,2, . . .
    from film      video              from film Other editing operations may result in an "orphan" field as illustrated in the following pattern:

3,2,3,2,3,2,1,2,3, . . .
↑

This editing operation results in a single orphan field of a given film frame remaining in the video sequence. A number of other situations may result in interruption of the 3:2 pulldown pattern, including purposeful deviations from the pattern to produce more effective pan, fade or slow motion effects.

Prior art video encoding systems such as system 12 of FIG. 1A generally utilize adaptive filters to facilitate a number of processing operations. For example, an adaptive filter may be used in the inverse telecine circuit 18 to facilitate detection of the 3:2 pulldown pattern phase. Other applications for adaptive filtering in the video encoding system 12 include deinterlacing to reduce full resolution images to SIF resolution images, adaptive field/frame filtering, and video framing for PAL video sequences. However, conventional filters are unable to provide adequate performance in these and other video processing applications. For example, conventional filters utilized in inverse telecine circuit 18 may have difficulty acquiring the 3:2 pulldown pattern phase from a limited amount of data. The inverse telecine circuit 18 may therefore have to compile large amounts of field comparison statistics and will not be well-suited for real-time operation. In addition, interpolated pixels generated by conventional filters for a given group of odd field and even field pixels often fall at different vertical positions. A difference signal generated by subtracting the interpolated pixels may therefore include an undesirable vertical signal component which can obscure or distort the desired motion signal component. This can be a source of inaccuracy when the interpolated pixels are compared as part of a deinterlacing, inverse telecine, field/frame filtering or video framing process. The problem is particularly significant for low motion scenes of the video frame sequence in which a motion signal generated from a comparison of interpolated pixels may have a magnitude comparable to or less than that of a vertical signal introduced by the filtering process.

As is apparent from the foregoing, a need exists for improved adaptive filtering techniques suitable for use in deinterlacing, inverse telecine, field/frame filtering, video framing and other video processing applications.

SUMMARY OF THE INVENTION

The present invention provides a method and apparatus for filtering a video frame sequence to be encoded. The filtering produces interpolated pixels for even and odd fields of a given frame at substantially the same vertical position, and can thereby provide more accurate opposite-parity field comparison and corresponding performance improvements in deinterlacing, inverse telecine, field/frame filtering, video framing and other video processing applications.

A preferred embodiment of an adaptive filter in accordance with one aspect of the invention includes an odd-tap vertical filter which is used to filter a group of pixels in an even field of the video frame sequence and an even-tap vertical filter which is used to filter a corresponding group of pixels in an odd field of the video frame sequence. The odd-tap filter may be a seven-tap filter while the even-tap filter is a four-tap filter, although other numbers of taps could also be used depending upon the tradeoff between resolution and computation complexity made in a given application. The odd-tap and even-tap filters produce interpolated pixels for each of the corresponding groups of even field and odd field pixels. The use of the even-tap filter in the odd field ensures that the resulting interpolated pixels are located at substantially the same vertical position in their respective fields. This significantly reduces the undesirable vertical signal content of a difference signal generated by comparing the interpolated pixels. The comparison of the interpolated pixels will therefore provide a more accurate indication of interfield motion or other interfield characteristics than has heretofore been possible using conventional filtering techniques.

Another aspect of the invention involves the use of the above-described odd-tap and even-tap vertical filters in a deinterlacing operation to generate a reduced resolution image in a video processing system. The interpolated pixels from the odd-tap and even-tap filters described above are applied to an adaptive interfield filter which generates a difference signal by subtracting the interpolated pixels. The value of the difference signal determines the amount and type of interfield filtering applied to the interpolated pixels. If the difference signal is below a first threshold, the output of the interfield adaptive filter will be an average of the two interpolated pixels. If the difference signal is above the first threshold but below a second threshold, the interfield filter output becomes increasingly more heavily weighted toward the even field interpolated pixel. If the difference signal is above the second threshold, the interfield filter output includes only the even field interpolated pixel. The interfield filter output may be temporally filtered by combining it in a weighted sum with the interfield filter output generated for a previous frame in the video sequence.

Another aspect of the invention involves utilizing the above-described odd-tap and even-tap filters in an inverse telecine circuit. Even fields of two adjacent frames are applied to two separate odd-tap filters, while odd fields of the two adjacent frames are applied to two separate even-tap filters. The resulting interpolated pixels are applied to a processor which generates difference signals by subtracting pairs of the interpolated pixels generated for opposite-parity fields. The use of the above-described even-tap filter to generate the odd field interpolated pixels substantially reduces undesirable vertical signal components and thereby permits more accurate comparisons of opposite-parity fields of the adjacent frames. A 3:2 pulldown pattern can therefore be identified more quickly and accurately than is possible using prior art techniques in which the presence of vertical signal components limits the comparison to same-parity fields. The comparison of opposite-parity fields also facilitates the detection of orphan fields in the video sequence, since orphan fields will generally exhibit motion relative to both previous and subsequent opposite-parity fields.

Another aspect of the invention involves utilizing the above-described odd-tap and even-tap filters in adaptive field/frame filtering. An even field is applied to both an odd-tap and an even-tap vertical filter, while an odd field is also applied to both an odd-tap and an even-tap vertical filter. The resulting pairs of interpolated pixels are applied to interfield adaptive filters. Each interfield adaptive filter generates a blended pixel based on the value of a difference signal generated by comparing the pair of interpolated pixels applied thereto. The blended pixels may then each be applied to a separate temporal filter. This adaptive field/frame filtering process adapts on a pixelby-pixel basis between field-based filtering, frame-based filtering and a weighted sum of field-based and frame-based filtering, and is particularly well-suited for use with certain types of common video frame sequences. For example, the process provides significantly improved performance for video sequences with a static background suitable for frame-based filtering and a dynamic foreground which requires field-based filtering.

Another aspect of the invention involves utilizing the above-described odd-tap and even-tap filters in PAL video framing. PAL applications generally do not utilize the above-described 3:2 pulldown technique to incorporate film material into a video sequence. Instead, film material in PAL applications typically has a frame rate of 25 frames per second instead of the usual 24 frames per second, such that each PAL video frame corresponds to a single film frame. Proper video framing is therefore very important in PAL applications. In accordance with the invention, even fields of two adjacent frames are applied to two separate odd-tap filters, while odd fields of the two adjacent frames are applied to two separate even-tap filters. The resulting interpolated pixels are applied to a processor which generates difference signals by subtracting pairs of the interpolated pixels generated for opposite-parity fields. The interpolated pixel generated for a given even field can thus be compared directly to two candidate opposite-parity odd fields so the processor can decide which of the two candidate fields should be grouped into a frame with the given even field. Improved framing is provided by applying the above-described even-tap filter to the opposite-parity fields prior to the comparison. This ensures that undesirable vertical signal components of the difference signals will be substantially eliminated and therefore will not improperly influence the decision process. It should be noted that without this filtering technique, relatively small amounts of vertical signal could result in an erroneous PAL field grouping decision.

The present invention detects and processes interfield motion and other characteristics without the need for compilation of large amounts of field comparison statistics and in a manner well-suited for real-time operation. The invention provides other advantages over the prior art, including faster identification of putldown pattern phase, orphan fields and other video sequence characteristics, and more robust decisions based on opposite-parity field comparisons.

BRIEF DESCRIPTION OF THE DRAWINGS

FIGS. 5A and 5B illustrate exemplary inverse telecine techniques in accordance with another aspect of the present invention.

DETAILED DESCRIPTION OF THE INVENTION

The present invention will be illustrated below in conjunction with exemplary video processing applications suitable for use in an MPEG-2 compliant video encoder. It should be understood that the invention is also more broadly applicable to numerous alternative encoding and video signal processing applications. For example, the inverse telecine aspects of the invention can provide significant advantages in any application involving processing of a sequence of video frames which includes source telecine material. Furthermore, although illustrated in the context of MPEG-2 compliant encoding, the invention may also be used in conjunction with systems utilizing other video encoding standards.

Figure 3:
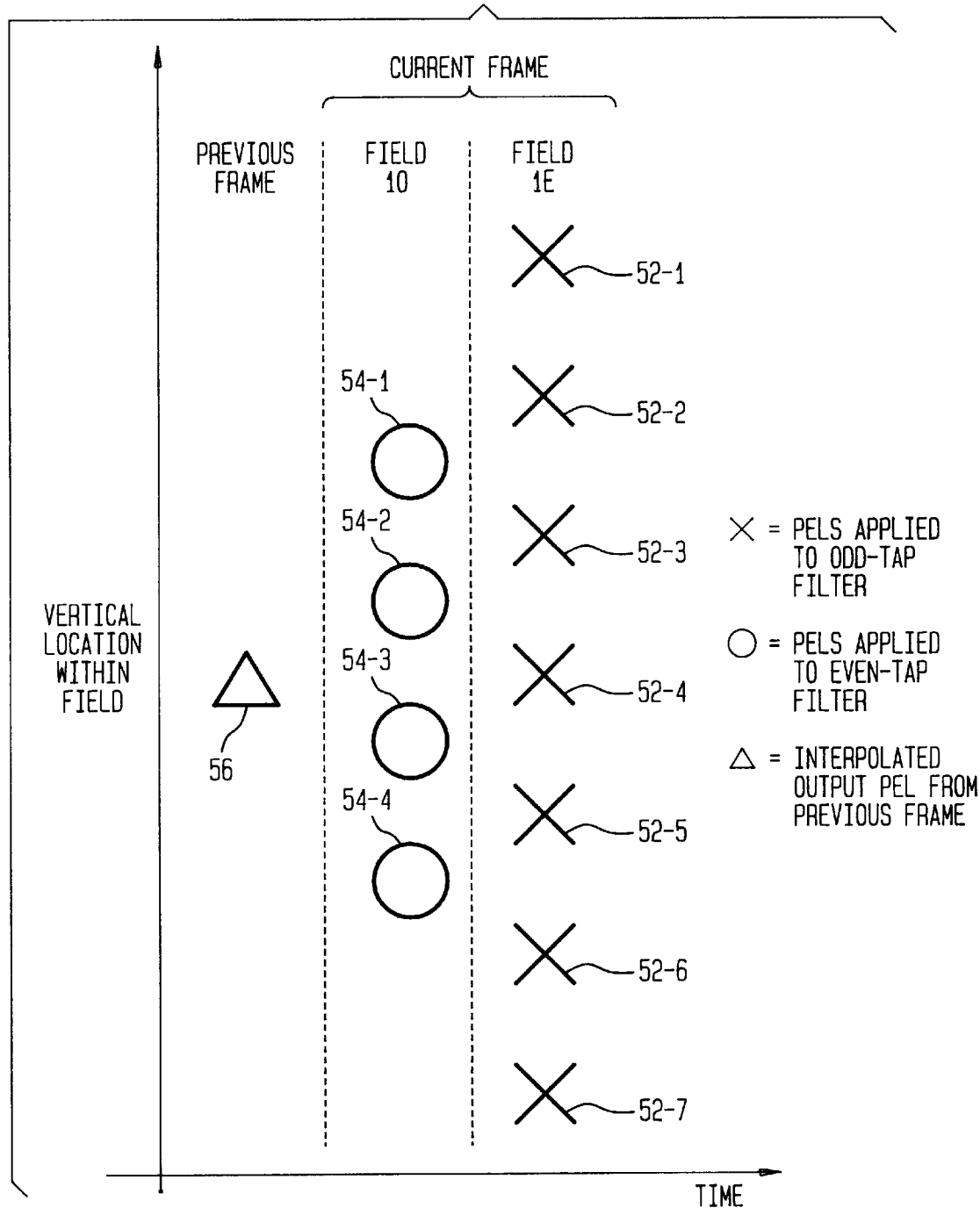
FIG. 3 illustrates the operation of an exemplary embodiment of an adaptive filter in accordance with the present invention.

FIG. 3 illustrates the operation of an exemplary adaptive filter in accordance with the present invention. The vertical axis of the FIG. 3 diagram corresponds to vertical pixel location within a given field or frame, while the horizontal axis corresponds to time. A first group of pixels in an even field 1E of a current frame includes seven pixels 52-1 through 52-7 each designated by an X. A second group of pixels in an odd field 10 includes four pixels 54-1 through 54-4 each designated by an 0. The diagram of FIG. 3 also shows an interpolated pixel 56 generated for a field of a previous frame. Interpolated pixels will also be referred to herein as samples. An adaptive filter in accordance with one embodiment of the present invention includes an odd-tap filter which is applied to the first group of pixels 52-1 through 52-7 from the even field 1E, and an even-tap filter which is applied to the second group of pixels 54-1 through 54-4 from the odd field 10.

The odd-tap filter in this example is a 7-tap filter which generates an interpolated pixel for field 1E by multiplying each of the seven pixels 52-1 through 52-7 by a predetermined filter coefficient and summing the results. The 7-tap filter may utilize filter coefficients of -1, 0, 9, 16, 9, 0 and -1 such that the sum of the coefficients is 32. The interpolated pixel generated for the first group of pixels in field 1E will have a vertical position which corresponds to that of the middle pixel 52-4. This vertical position also corresponds to that of the interpolated pixel 56 generated for a field of the previous frame. The even-tap filter in this example is a 4-tap filter which generates an interpolated pixel for field 10 by multiplying each of the four pixels 54-1 through 54-4 by a predetermined filter coefficient and summing the results. The 4-tap filter may utilize filter coefficients of 1, 3, 3 and 1 such that the sum of the coefficients is 8. The interpolated pixel generated for the second group of pixels in field 10 will have a vertical position which also corresponds to that of the middle pixel 52-4. It should be noted that although illustrated for an interlaced sequence, the filtering technique of FIG. 3 could also be applied to a progressive sequence in which the groups of pixels from fields 1E and 10 are interleaved at the same horizontal coordinate.

The use of the even-tap filter in the odd field 10 serves to move the resulting odd field interpolated pixel to a position which corresponds to that of the even field interpolated pixel generated by the odd-tap filter. This improves the accuracy of any subsequent comparison of the interpolated pixels for fields 1E and 10. The comparison of a pixel from one field to a corresponding pixel in another field by subtracting the pixels will produce a difference signal which generally includes a vertical signal, a motion signal and noise. The vertical signal and the noise are undesirable and can distort and obscure the desirable motion signal component of the difference signal. The use of the above-described even-tap and odd-tap filters prior to subtracting the interpolated pixels from fields 1E and 10 substantially reduces the vertical signal and noise distortion and thereby provides a more accurate difference signal. This improved difference signal enhances the performance of deinterlacing, inverse telecine, field/frame adaptive filtering, PAL framing and other video processing operations. For example, in the case of inverse telecine processing, difference signals generated for different groups of pixels in a pair of fields are summed to determine if sufficient motion exists between the fields to ensure that one of the fields is not a repeat of the other. The use of difference signals generated in accordance with the filtering technique of FIG. 3 permits improved inverse telecine processing without the need for compilation of large amounts of field comparison statistics and therefore in a manner well-suited for real-time operation.

It should be noted that in the exemplary embodiment of FIG. 3 the even field 1E has been arbitrarily selected as a preferred field and is therefore applied to the higher resolution 7-tap filter. The odd field 10 could be selected as the preferred field and applied to the higher resolution filter in other embodiments. It should also be emphasized that the 7-tap and 4-tap filters and the coefficients thereof are merely exemplary. Numerous alternative types and amounts of filtering suitable for each of the fields 1E and 10 can of course be used and will be readily apparent to those skilled in the art. Exemplary alternatives to the 7-tap and 4-tap vertical filters include higher resolution filters which generally provide sharper transition regions at the cost of increased computation complexity, or lower resolution filters which provide reduced computation complexity at the cost of softer transition regions. In addition, the odd-tap and even-tap filters in accordance with the invention need not be implemented as straight vertical filters. Furthermore, although the odd-tap and even-tap filters of the present invention are preferably implemented as symmetric filters, alternative embodiments may utilize filters with an amount of asymmetry determined to be acceptable for a given application.

Figure 1A:
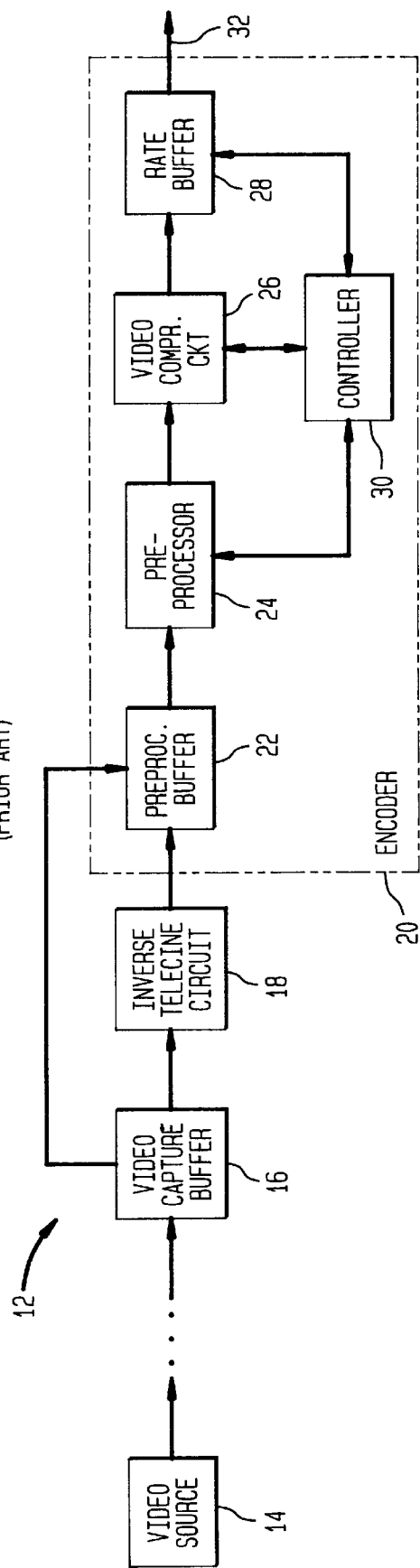
FIG. 1A is a block diagram of an exemplary video encoding system in which adaptive filtering in accordance with the present invention may be implemented.
Figure 2A:
FIG. 2A shows video fields generated from corresponding film frames in accordance with a conventional 3:2 pulldown pattern.
Figure 1B:
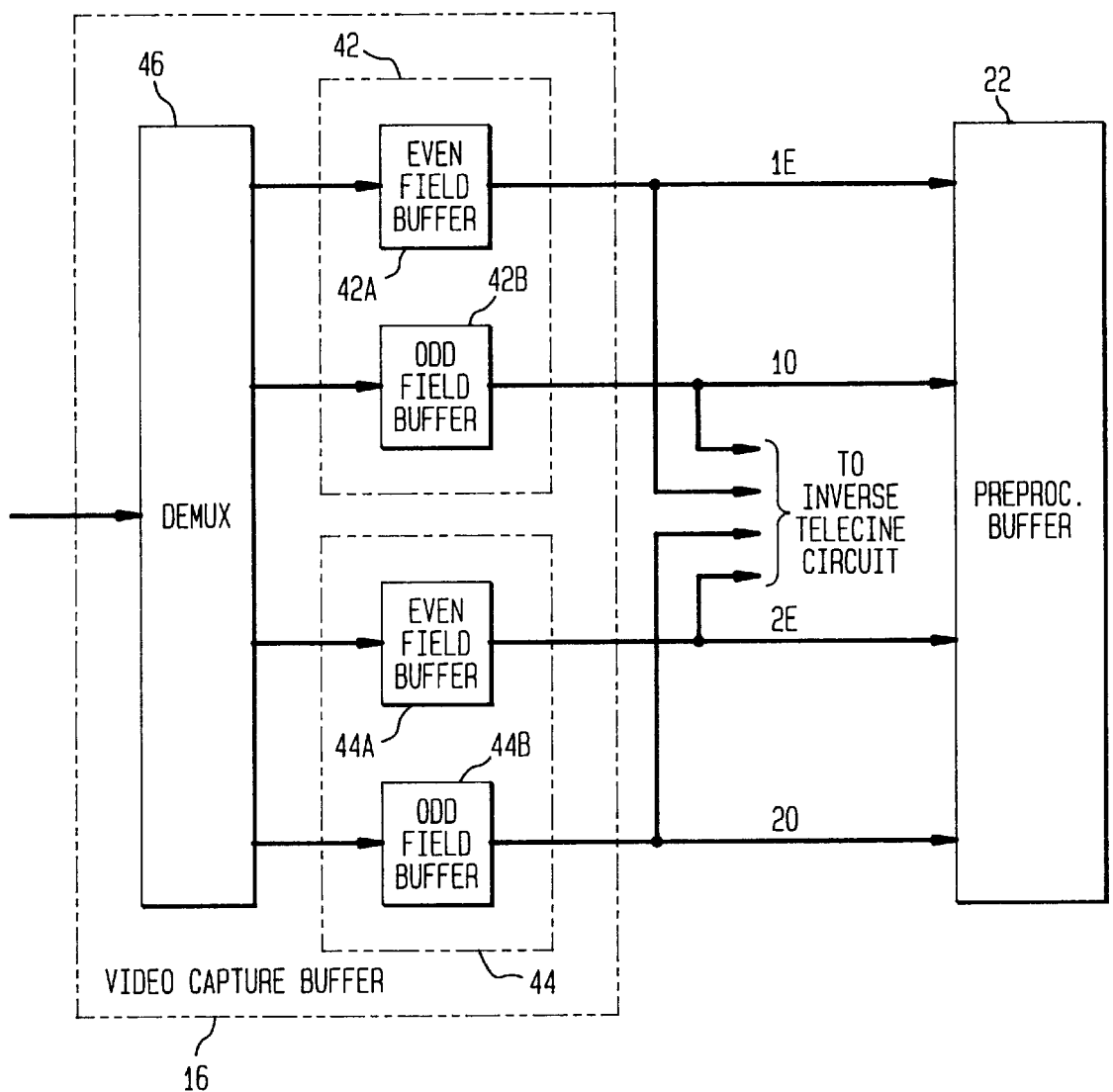
FIG. 1B is a more detailed block diagram of an exemplary video capture buffer in the video encoding system of FIG. 1A.
Figure 2B:
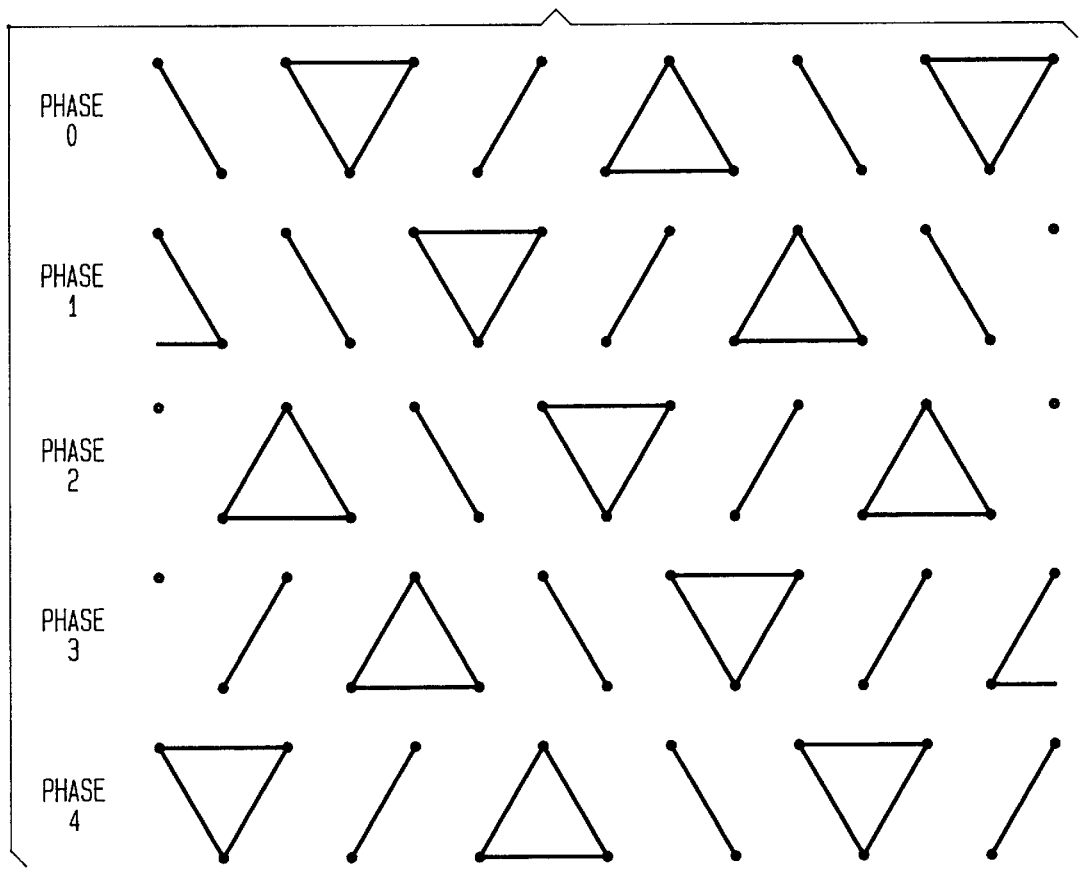
FIG. 2B shows the five possible phases of a 3:2 pulldown pattern.
Figure 4A:
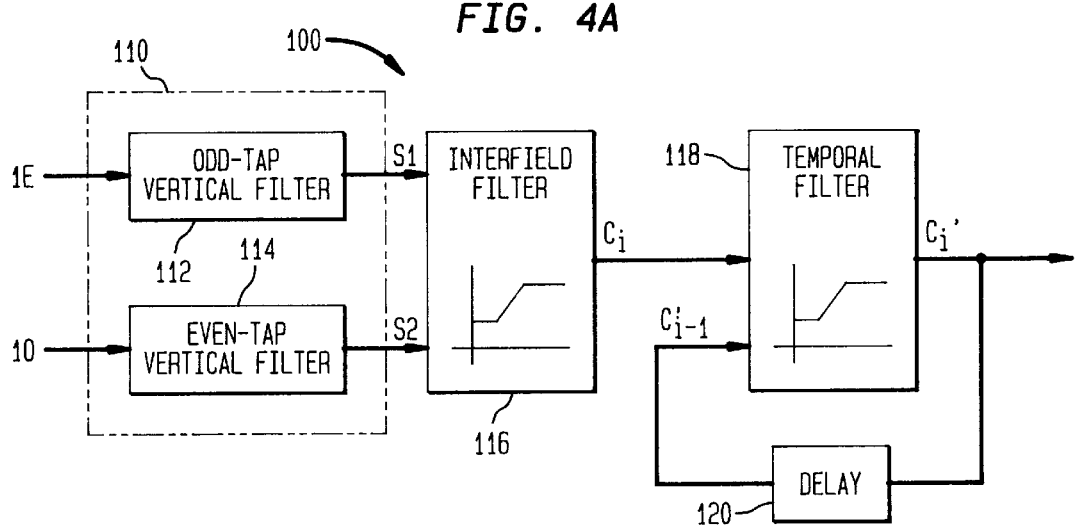
FIG. 4A illustrates an exemplary deinterlacing technique in accordance with one aspect of the present invention.
Figure 4B:
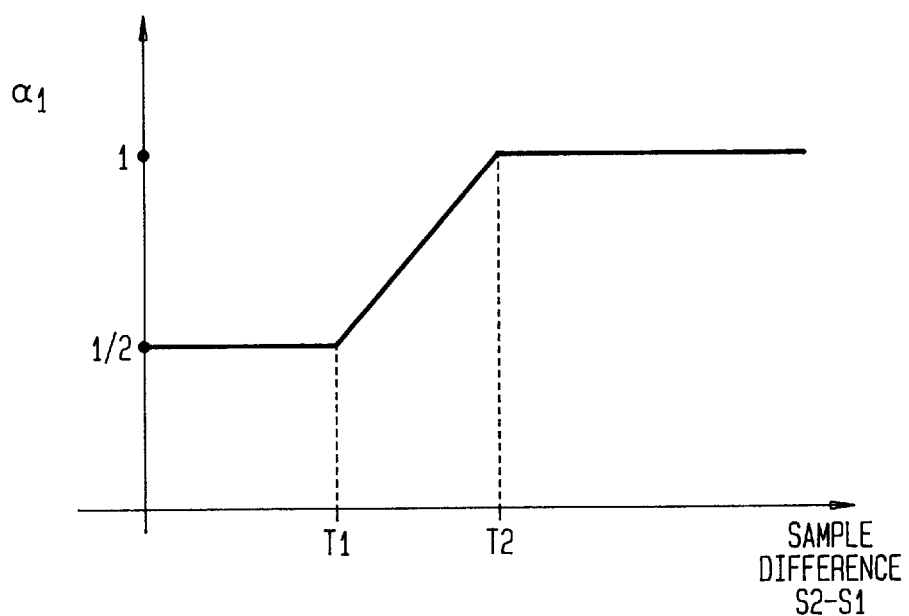
FIG. 4B is a plot of an exemplary interfield adaptive filter characteristic in accordance with the present invention.

FIGS. 4A and 4B illustrate an exemplary deinterlacing technique which utilizes the above-described odd-tap and even-tap filters to generate a reduced resolution image from a full resolution image. A deinterlacing processor 100 shown in FIG. 4A includes a filter 110 having an odd-tap vertical filter 112 and an even-tap vertical filter 114. An even field 1E from the video capture buffer 16 of FIG. 1B is applied to the odd-tap vertical filter 112 and an odd field 10 is applied to the even-tap vertical filter 114. The filters 112, 114 generate interpolated pixels or samples S1 and S2 for respective first and second groups of pixels from the respective 1E and 10 fields in the manner described in conjunction with FIG. 3 above. The resulting samples S1 and S2 are applied to an interfield adaptive filter 116 which generates a blended pixel $C_i$ for the 1E and 10 fields in accordance with the following equation:

$$C_i = \alpha_1 S1 + (1-\alpha_1)S2$$

in which the variable $\alpha_1$ represents a blending value which is plotted in FIG. 4B as a function of the difference S2-S1 between the samples.

FIG. 4B and the above equation indicate that if the sample difference S2-S1 is below a first threshold T1, the fields 1E and 10 are sufficiently similar to be blended, and the value of $\alpha_1$ is set to 0.5. If the difference S2-S1 is below a second threshold T2 as shown in FIG. 4B but above the first threshold T1, the fields are still sufficiently similar to be blended, but the value of $\alpha_1$ is linearly increased above 0.5 such that the blended pixel $C_i$ generated in accordance with the above equation is weighted to include more of the features of the 1E field sample S1 and less of the 10 field sample S2. If the difference S2-S1 exceeds the threshold T2, the samples of fields 1E and 10 are not sufficiently similar to be blended, and the blended pixel $C_i$ is generated entirely from the 1E field sample S1. The filtering and blending process performed by filters 112, 114 and 116 of processor 100 of FIG. 4A is repeated for other groups of pixels in the fields 1E and 10 to produce a deinterlaced reduced-resolution image. Without the above-described even-tap and odd-tap filtering, the sample difference S2-S1 may be unduly increased by the presence of both vertical signal and noise components, thereby improperly reducing the contribution of the second field to the blended pixel output. Sufficiently strong vertical signal strength may result in one of the fields being dropped in its entirety, which could cause substantial aliasing in the resulting image.

Referring again to FIG. 4A, a blended pixel $C_i$ generated by the adaptive interfield filter 116 may be temporally filtered in temporal filter 118 to reduce electrical noise, film grain noise and other disturbances such as camera jitter. The temporal filter 118 in this example generates a filtered blended pixel $C_i'$ as a weighted sum of a current blended pixel $C_i$ and a previous blended pixel $C_{i-1}'$ generated for a previous frame in the video sequence. The temporal filtering operation is illustrated in the following equation:

$$C_i' = \alpha_2 C_i + (1-\alpha_2)C_{i-1}'$$

in which $\alpha_2$ is an adaptive constant controlled by the thresholds T1 and T2 in a manner similar to that described above for the constant $\alpha_1$. The values of T1 and T2 used to determine the value of $\alpha_2$ will typically be lower than those used to determine the value of $\alpha_1$, because motion is generally more likely to have occurred between frames than between fields in that the temporal distance is greater. The adaptive interfield filtering and temporal filtering operations are repeated for different groups of pixels in the fields 1E and 10 to generate the above-noted reduced-resolution deinterlaced frame.

Figure 5A:
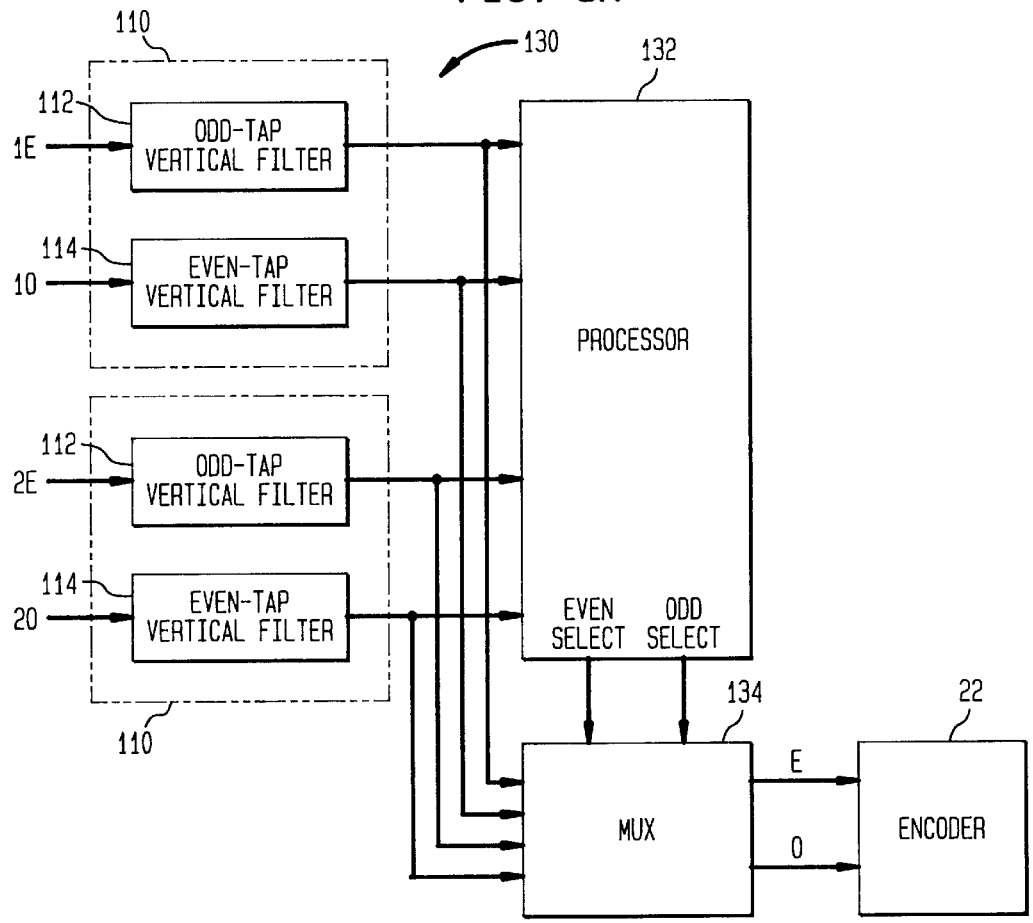

FIGS. 5A and 5B illustrate exemplary inverse telecine applications of the odd-tap and even-tap filtering of FIG. 3. An inverse telecine circuit 130 in FIG. 5A includes a first filter 110 which receives the 1E and 10 fields from the video capture buffer of FIG. 1B and a second filter 110 which receives the 2E and 20 fields from the video capture buffer. The fields 1E, 10, 2E and 20 applied to the telecine circuit 130 may be horizontally and/or vertically decimated and/or may include only luma pixels. For example, a 2:1 horizontal and/or vertical decimation factor may be used. The vertical resolution of the decimated fields should be sufficient to eliminate aliasing artifacts and ghosts caused by interfield motion. A vertical resolution between about 240 and 288 will generally be acceptable for most applications. The inverse telecine technique may also be used with full horizontal and vertical resolution images.

Each of the filters 110 of inverse telecine circuit 130 includes an odd-tap vertical filter 112 which filters the even field 1E or 2E and an even-tap vertical filter 114 which filters the odd field 10 or 20. The outputs of the filters 112, 114 represent interpolated pixels or samples which are applied to a processor 132. The processor 132 performs a number of functions related to detection of 3:2 pulldown pattern phase. The processor 132 first generates a number of sample differences including 1E-10, 2E-10 and 2E-20. These sample differences provide an indication of the relative motion between the fields and thus an indication of the position of repeat fields in the video sequence. The processor 132 utilizes these sample differences to determine whether a given field is a repeat field or an orphan field. The presence of a repeat field is indicated by a lack of interfield motion relative to a same-parity or opposite-parity field. The presence of an orphan field is indicated by more than a threshold amount of interfield motion relative to both a previous and subsequent opposite-parity field. Based on these determinations, the processor 132 generates even select and odd select signals which are applied to select signal inputs of a multiplexer 134. The multiplexer 134 selects either the even or odd field to be supplied to the encoder 22 and can thereby drop any of the input fields which appear to be either repeat fields or orphan fields. The encoder 22 therefore receives only those fields of the input video sequence which are needed to provide a properly encoded output video bitstream.

FIG. 5B shows an alternative inverse telecine circuit 130' in which the fields 1E, 10, 2E and 20 are applied directly to the signal inputs of the multiplexer 134. In this embodiment, the interpolated pixels generated by the filters 112, 114 are used in processor 132 to determine the presence of repeat or orphan fields in the manner previously described, and then discarded. As in the embodiment of FIG. 5, the processor 132 generates even select and odd select signals which are applied to select signal inputs of a multiplexer 134. The multiplexer 134 then selects either even or odd field original pixels to be supplied to the encoder 22. It should be noted that other embodiments of the invention described herein may similarly utilize the interpolated pixels from the odd-tap and even-tap filters for processing analysis only, while even or odd field original pixels are delivered to the encoder based on the results of the analysis.

The odd-tap and even-tap filtering applied in the inverse telecine circuits 130 of FIG. 5A and 130' of FIG. 5B removes substantially all of the above-described vertical signal component from the pixel difference signals and thereby permits accurate opposite-parity field comparisons as well as same-parity field comparisons. The comparison of sample difference signals for opposite-parity fields and same-parity fields allows film to video transitions to be detected more quickly. The 3:2 pulldown pattern phase can therefore be recovered more quickly and accurately with less accumulated field data than is possible using prior art techniques. The comparison of opposite-parity fields also provides improved detection of orphan fields. These and other features make the odd-tap and even-tap filtering technique particularly well-suited for use in practical real-time encoding systems with limited field storage memory.

Figure 6:
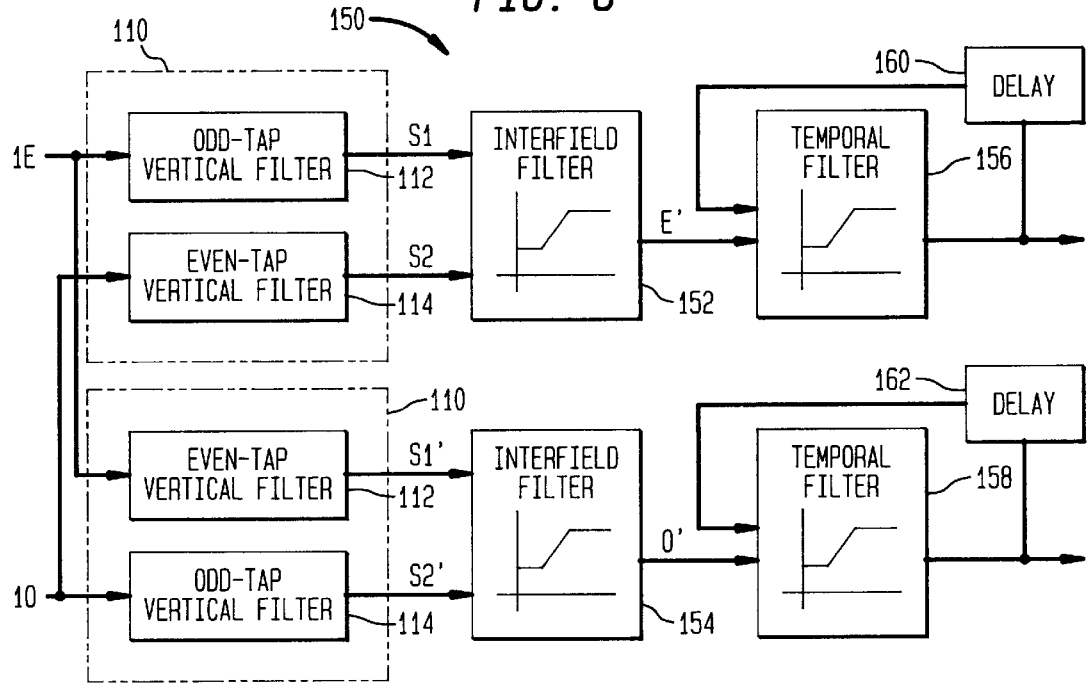
FIG. 6 illustrates an exemplary field/frame adaptive filtering technique in accordance with another aspect of the present invention.

FIG. 6 illustrates an exemplary adaptive field/frame filtering application of the odd-tap and even-tap filtering technique of FIG. 3. An adaptive field/frame filter 150 is configured such that the even field 1E and odd field 10 are each applied to both an odd-tap filter 112 and an even-tap filter 114. The odd-tap and even-tap filters which receive the 1E field generate samples S1 and S1', respectively, for a group of pixels in the 1E field. The even-tap and odd-tap filters which receive the 10 field generate samples S2 and S2', respectively, for a group of pixels in the 10 field. The samples S1 and S2 are applied to an adaptive interfield filter 152 which operates in a manner similar to that described above for interfield filter 116 of FIG. 4A. The interfield filter 152 generates a blended output pixel E' for the 1E field using the blending technique illustrated in conjunction with FIG. 4B above. The samples S1' and S2' are applied to an adaptive interfield filter 154 which also operates in a manner similar to interfield filter 116 of FIG. 4A. The interfield filter 154 generates a blended output pixel O' for the 10 field using the blending technique of FIG. 4B. The blended output pixels E' and O' may be temporally filtered using temporal filters 156, 158 in conjunction with delay elements 160, 162. The temporal filters 156, 158 and delay elements 160, 162 may be configured to operate in a manner similar to temporal filter 118 and delay element 120 of FIG. 4A.

The adaptive field/frame filter 150 adapts on a pixel-by-pixel basis between field-based filtering, frame-based filtering and a weighted sum of field-based and frame-based filtering. The field/frame filter 150 utilizes field-based filtering to generate a given blended output pixel E' or O' if the corresponding sample difference signal S2-S1 or S2'-S1' is greater than the threshold T2 as shown in FIG. 4B. Frame-based filtering is utilized to generate the given blended output pixel E' or O' if the corresponding sample difference signal S2-S1 or S2'-S1' is less than the threshold T1 of FIG. 4B. A weighted sum of field-based and frame-based filtering is utilized to generate the given blended output pixel E' or O' if the corresponding sample difference signal S2-S1 or S2'-S2' is between the first and second thresholds T1 and T2. This adaptive field/frame filtering process is particularly well-suited for use with certain types of common video frame sequences. For example, the process provides significantly improved performance for video sequences with a static background suitable for frame-based filtering and a dynamic foreground which requires field-based filtering.

Figure 7:
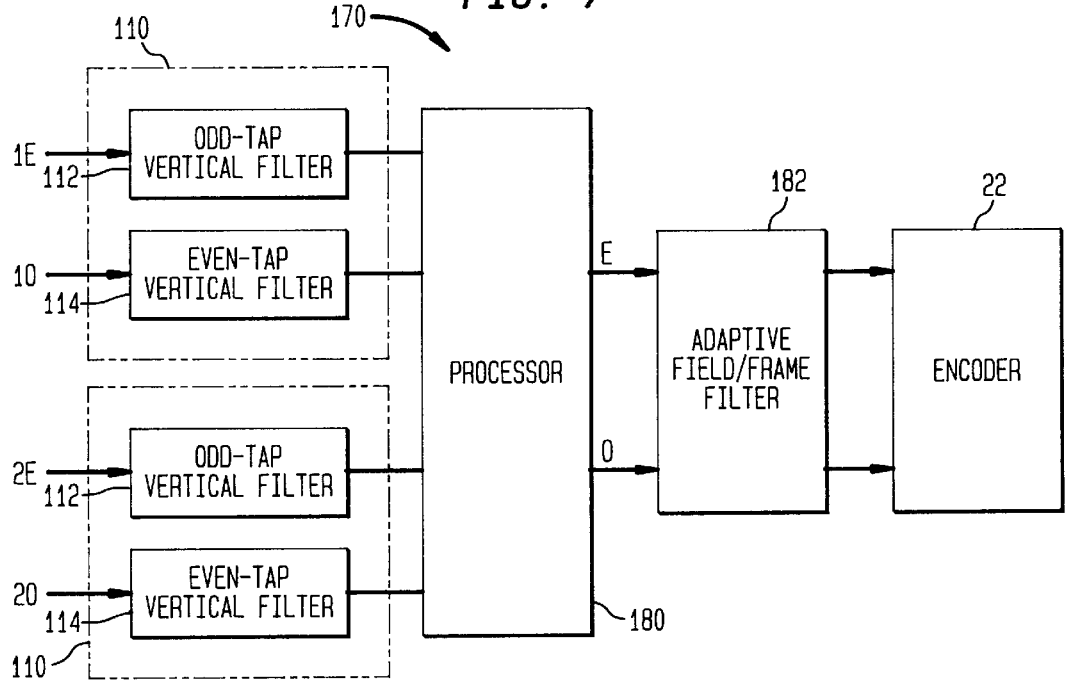
FIG. 7 illustrates an exemplary video framing technique in accordance with another aspect of the present invention.

FIG. 7 illustrates an exemplary video framing application of the odd-tap and even-tap filtering technique of FIG. 3. A video framing filter 170 includes first and second filters 110. The first filter 110 includes an odd-tap filter 112 which receives an even field 1E and an even-tap filter 114 which receives an odd field 10. The second filter 110 includes an odd-tap filter 112 which receives an even field 2E and an even-tap filter 114 which receives an odd field 20. The fields applied to the filters 112, 114 may be horizontally and/or vertically decimated and/or may include only luma pixels. The interpolated pixel outputs of each of the filters 112, 114 are applied to a processor 180 which generates difference signals corresponding to the differences 10-1E, 10-2E and 20-2E. The processor 180 utilizes these difference signals to associate fields into PAL frames.

It should be noted that PAL applications generally do not utilize the abovedescribed 3:2 pulldown technique to incorporate film material into a video sequence. Instead, the film material in PAL applications typically has a frame rate of 25 frames per second instead of the usual 24 frames per second, such that each PAL video frame corresponds to a single film frame. Proper video framing is very important in such an application. For example, if the video framing is off by one field, each PAL video frame would include fields from two instants in time instead of one. This improper grouping of fields precludes the use of frame prediction, frame discrete cosine transform (DCT) and other compression techniques, and gives rise to other problems such as orphan fields at the end of film segments and scene changes which occur halfway through an encoded frame rather than between frames.

The processor 180 compares the output interpolated pixels generated for odd field 10 to interpolated pixels generated for both the previous opposite-parity field 1E and the subsequent opposite-parity field 2E. The interpolated pixels generated for odd field 20 are compared to the interpolated pixels generated for opposite-parity field 2E. The comparison may involve generating the mean-squared error using the difference signals 10-1E, 10-2E and 20-2E for all interpolated pixels generated over these fields. The processor 180 then uses the results of the comparison to decide which of the fields should be grouped together into frames for encoding. For example, if the 10-1E comparison yields the minimum total mean-squared error, these two frames may be grouped together into a frame and supplied to encoder 22. An adaptive field/frame filter 182 may be connected between the processor 180 and the encoder 22 as shown to provide field/frame filtering in the manner described in conjunction with FIG. 6 above. The video framing filter 170 of FIG. 7 provides improved framing by applying the above-described even-tap filter to opposite-parity fields prior to the comparison and decision process. This ensures that undesirable vertical signal components of the difference signals will be substantially eliminated and therefore will not improperly influence the comparison and decision process. It should be noted that without this filtering technique, relatively small amounts of vertical signal could result in an erroneous field grouping decision.

The above-described applications of the even-tap and odd-tap filtering of the present invention are merely illustrative of the numerous video processing applications which may utilize the disclosed techniques. It should be understood that the filters and other processing elements shown may be implemented in software, hardware or combinations thereof. For example, the disclosed filtering techniques may be implemented using a computer, central processing unit, controller, microprocessor, application-specific integrated circuit (ASIC) or other digital data processor or portion thereof programmed to provide the processing operations described in conjunction with FIGS. 3–7 above. Furthermore, it should be noted that the filters and other processing elements described above may be incorporated within one or more of the inverse telecine circuit 18, the preprocessor 24, the controller 30 or other elements of encoding system 12, or may be arranged as separate preprocessing elements within such an encoding system. These and numerous other alternative embodiments within the scope of the appended claims will be readily apparent to those of ordinary skill in the art.

I claim:

1. A method for processing a sequence of video frames, each frame including one or more fields, the method comprising the steps of:

filtering a first group of pixels from a first field of the sequence in a first odd-tap filter to generate a first interpolated pixel;

filtering a second group of pixels from a second field of the sequence in a first even-tap filter to generate a second interpolated pixel; and generating a difference signal from the first and second interpolated pixels.

2. The method of claim 1 wherein the first and second fields are adjacent opposite-parity fields in the sequence of video frames.

3. The method of claim 1 wherein the step of filtering a first group of pixels in an odd-tap filter further includes the step of filtering the first group of pixels in a seven-tap vertical filter.

4. The method of claim 1 wherein the step of filtering a second group of pixels in an even-tap filter further includes the step of filtering the second group of pixels in a four-tap vertical filter.

5. The method of claim 1 further including the step of generating a blended pixel from the first and second interpolated pixels if the difference signal is below a first predetermined threshold.

6. The method of claim 5 wherein the step of generating a blended pixel from the first and second interpolated pixels further includes the steps of:

generating the blended pixel as constant percentages of the first interpolated pixel and the second interpolated pixel if the difference signal is below a second threshold lower than the first threshold; and generating the blended pixel as a linearly increasing percentage of one of the first or second interpolated pixels if the difference signal is greater than the second threshold but less than the first threshold.

7. The method of claim 5 further including the step of temporally filtering a current blended pixel using a previous blended pixel generated from fields of a previous frame in the video sequence.

8. The method of claim 7 wherein the step of temporally filtering the current blended pixel further includes the step of computing a weighted sum of the current blended pixel and the previous blended pixel if a difference between the current and previous blended pixels is less than a first predetermined threshold.

9. The method of claim 1 further including the steps of:

filtering a third group of pixels from a third field of the sequence in a second odd-tap filter to generate a third interpolated pixel; and comparing differences between the first, second and third interpolated pixels to determine an inverse telecine pattern phase in the video sequence.

10. The method of claim 1 further including the steps of:

filtering the first group of pixels from the first field of the sequence in a second even-tap filter to generate a third interpolated pixel;

filtering the second group of pixels from the second field of the sequence in a second odd-tap filter to generate a fourth interpolated pixel;

generating a second difference signal from the third and fourth interpolated pixels; and generating a first blended pixel using the first and second interpolated pixels and the first difference signal; and generating a second blended pixel using the third and fourth interpolated pixels and the second difference signal.

11. The method of claim 1 further including the steps of:

filtering a third group of pixels from a third field of the sequence in a second odd-tap filter to generate a third interpolated pixel;

filtering a fourth group of pixels from a fourth field of the sequence in a second even-tap filter to generate a fourth interpolated pixel; and comparing differences between the first, second, third and fourth interpolated pixels to determine a framing pattern in the video sequence.

12. An apparatus for use in a video encoding system for processing a sequence of video frames, each frame including one or more fields, the apparatus comprising:

a first odd-tap filter for generating a first interpolated pixel from a first group of pixels in a first field of the sequence;

a first even-tap filter for generating a second interpolated pixel from a second group of pixels in a second field of the sequence; and a processor coupled to outputs of the first odd-tap filter and the first even-tap filter and operative to generate a difference signal from the first and second interpolated pixels.

13. The apparatus of claim 12 wherein the first and second fields are adjacent opposite-parity fields in the sequence of video frames.

14. The apparatus of claim 12 wherein the first odd-tap filter includes a seven-tap vertical filter.

15. The apparatus of claim 12 wherein the first even-tap filter includes a four-tap vertical filter.

16. The apparatus of claim 12 wherein the processor is further operative to generate a blended pixel from the first and second interpolated pixels if the difference signal is below a first predetermined threshold.

17. The apparatus of claim 16 wherein the processor is further operative to generate the blended pixel as constant percentages of the first interpolated pixel and the second interpolated pixel if the difference signal is below a second threshold lower than the first threshold.

18. The apparatus of claim 17 wherein the processor is further operative to generate the blended pixel as a linearly increasing percentage of one of the first or second interpolated pixels if the difference signal is greater than the second threshold but less than the first threshold.

19. The apparatus of claim 12 wherein the processor further includes a temporal filter connected to receive a current blended pixel and a previous blended pixel generated from fields of a previous frame in the video sequence, and is operative to generate from the current and previous blended pixels a temporally-filtered blended pixel.

20. The apparatus of claim 19 wherein the temporal filter generates the temporally-filtered blended pixel as a weighted sum of the current blended pixel and the previous blended pixel if a difference between the current and previous blended pixels is less than a first predetermined threshold.

21. The apparatus of claim 12 further including:

a second odd-tap filter for filtering a third group of pixels from a third field of the sequence to generate a third interpolated pixel;

wherein the processor is further operative to compare differences between the first, second and third interpolated pixels to determine an inverse telecine pattern phase in the video sequence.

22. The apparatus of claim 12 further including:

a second even-tap filter for filtering the first group of pixels from the first field of the sequence to generate a third interpolated pixel; and a second odd-tap filter for filtering the second group of pixels from the second field of the sequence to generate a fourth interpolated pixel;

wherein the processor is further operative to generate a second difference signal from the third and fourth interpolated pixels, to generate a first blended pixel using the first and second interpolated pixels and the first difference signal, and to generate a second blended pixel using the third and fourth interpolated pixels and the second difference signal.

23. The apparatus of claim 12 further including:

a second odd-tap filter for filtering a third group of pixels from a third field of the sequence to generate a third interpolated pixel; and a second even-tap filter for filtering a fourth group of pixels from a fourth field of the sequence to generate a fourth interpolated pixel;

wherein the processor is further operative to compare differences between the first, second, third and fourth interpolated pixels to determine a framing pattern in the video sequence.

* * * * *